US006626564B2

(12) United States Patent
Horii et al.

(10) Patent No.: US 6,626,564 B2
(45) Date of Patent: Sep. 30, 2003

(54) APPARATUS AND METHOD FOR AUTOMATICALLY ADJUSTING OPTICAL AXIS OF VEHICLE HEADLIGHTS

(75) Inventors: Yasutoshi Horii, Nagoya (JP); Hiroaki Okuchi, Farmington Hills, MI (US); Masanori Kondo, Nagoya (JP); Kenichi Nishimura, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/964,407

(22) Filed: Sep. 28, 2001

(65) Prior Publication Data

US 2002/0036901 A1 Mar. 28, 2002

(30) Foreign Application Priority Data

Sep. 28, 2000 (JP) ........................................ 2000-296880

(51) Int. Cl.$^7$ ................................................. B60Q 1/06
(52) U.S. Cl. ......................... 362/466; 362/43; 362/464; 315/81
(58) Field of Search ............................... 362/37, 43, 41, 362/464, 465, 466, 276, 802, 40, 11; 315/80, 81, 82

(56) References Cited

U.S. PATENT DOCUMENTS

| 5,588,733 A | 12/1996 | Gotou ......................... 362/37 |
| 6,343,869 B1 * | 2/2002 | Kobayashi .................... 315/77 |
| 6,505,947 B1 * | 1/2003 | Brinkmann et al. .......... 362/41 |

FOREIGN PATENT DOCUMENTS

| EP | 0761497 | 5/1996 |
| JP | A-11-198714 | 7/1999 |
| JP | B2-2950897 | 7/1999 |

* cited by examiner

*Primary Examiner*—Sandra O'Shea
*Assistant Examiner*—John Anthony Ward
(74) *Attorney, Agent, or Firm*—Posz & Bethards, PLC

(57) ABSTRACT

In a headlight optical axis adjusting apparatus and method for a vehicle, the shape of a road in front of the vehicle is detected by a CCD camera based on a change in lane marking line which indicates the lane width on the road, before the steering angle of a vehicle steering wheel is detected by a steering angle sensor. Left and right swivel lights of the vehicle are swiveled and adjusted based on the change in the lane marking line or the steering angle. The optical axis of the left or right swivel light is first swiveled and adjusted based on the change in the lane marking line. The driver's forward visibility can thus be improved before the driver turns the steering wheel.

6 Claims, 5 Drawing Sheets

FIG. 8  RELATED ART
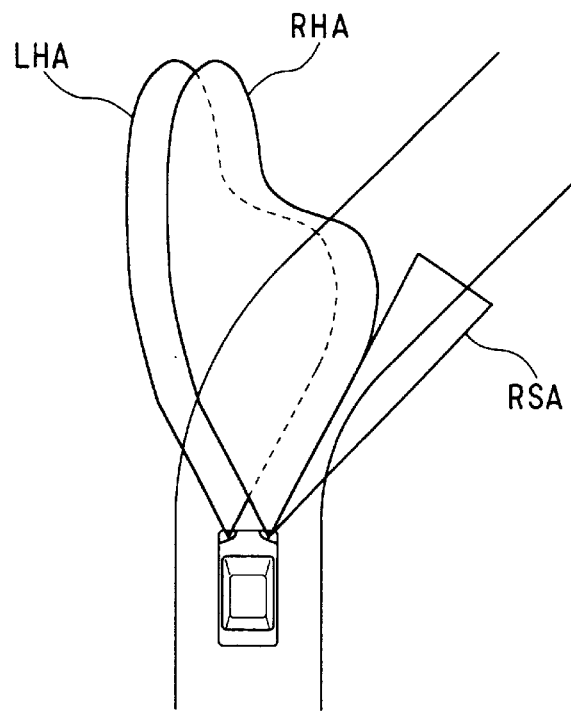
FIG. 9A
RELATED ART
FIG. 9B
RELATED ART
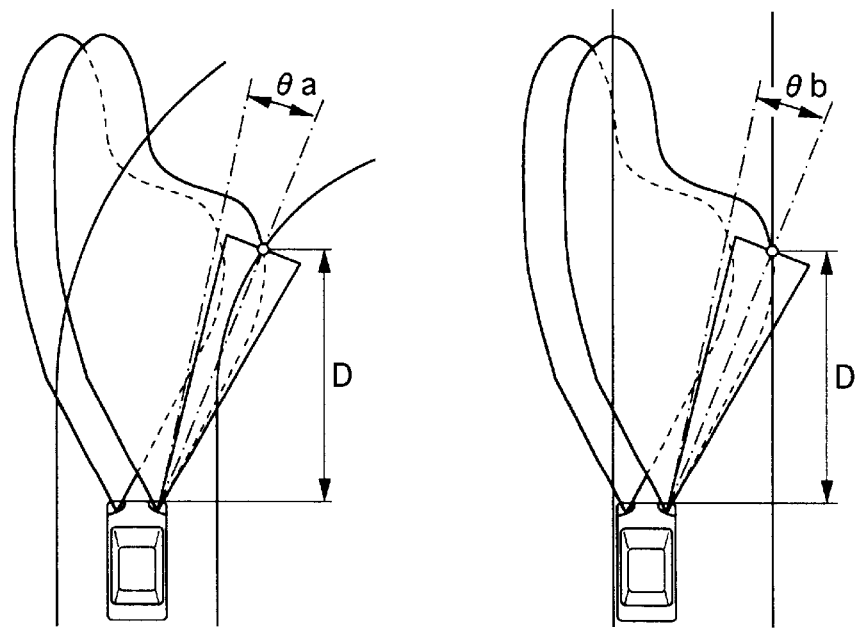

APPARATUS AND METHOD FOR AUTOMATICALLY ADJUSTING OPTICAL AXIS OF VEHICLE HEADLIGHTS

CROSS REFERENCE TO RELATED APPLICATION

This application is based on and incorporates herein by reference Japanese Patent Application No. 2000-296880 filed on Sep. 28, 2000.

BACKGROUND OF THE INVENTION

The present invention relates to an automatic vehicle headlight optical axis adjusting apparatus and method for automatically adjusting the illumination area and optical axis of left and right front illumination of headlights provided in a vehicle in conjunction with the steering angle of a steering wheel.

It is proposed to control the left and right swivel of the optical axis of headlights in conjunction with the steering angle of a steering wheel of a vehicle, thereby automatically adjusting the optical axis of the vehicle headlights.

When the road in front in the direction of travel curves to the right with a large radius of curvature and the vehicle is just about to enter the curve as shown in FIG. 8, the inside of the curve (right side in FIG. 8) is outside an illumination area (low beam illumination area) RHA of a right headlight, a main headlight, and is not illuminated. To improve visibility in front of the vehicle, it is therefore desirable to swivel a right swivel light used as an auxiliary headlight so that the inside of the curve is within the area RSA illuminated by the right swivel light. However, this swivel illumination should be provided before the steering angle of the steering wheel is changed. It is therefore not possible to control the swivel of the illumination.

It is also proposed to detect road curvature, etc. from lane markings on the road surface in front of the vehicle in the direction of travel and to control right and left swiveling of the optical axis of the headlights.

However, when the desired swivel angle for swivel control is calculated according to the detected lane markings, etc., erroneous results can occur depending upon, for example, the position of the vehicle relative to the road or lane width, or the road shape.

Various situations are shown in FIGS. 9A and 9B. FIG. 9A shows a right curve in the road to the front in the direction of travel with swivel angle θa based on the white edge line of the right curve, and FIG. 9B shows a straight road in front in the direction of travel with swivel angle θb based on the white edge line of this straight road.

As shown in FIG. 9A, when the road in front of the vehicle curves to the right, swivel angle θa calculated based on the right white edge line existing a specific distance D from the vehicle takes the right curve of the road into account. On the other hand, as shown in FIG. 9B, when the vehicle is on the left side of the lane, angle θb calculated from a right edge line existing the specific distance D from the vehicle is substantially the same as when the road curves right even though the road in front of the vehicle is straight with the same lane width as the curved road in FIG. 9A.

Front visibility can be improved more naturally for the driver by swiveling the optical axis of the headlights when the road in front in the direction of travel curves, and not swiveling the optical axis of the headlights when the road is straight. However, because it is not possible to recognize whether the road curves or is straight, the headlight erroneously swivels the same angle.

SUMMARY OF THE INVENTION

It is an object of the present invention to provide an apparatus and method for automatically adjusting an optical axis of vehicle headlights by detecting the curvature of the road etc. in front of the vehicle with good precision based on change in the white edge line, etc. as lane markings while the vehicle is moving, lane markings on the road indicating lane width, to adjustably swivel the optical axis of a vehicle headlight.

According to the present invention, a road in front of a vehicle is detected as curving based on change in position information at at least two different distances of lane markings indicating lane width on a road surface in front of a vehicle before a steering angle of a steering wheel of the vehicle is detected. The optical axis of a vehicle headlight is adjusted to swivel. The optical axis of the headlight is swiveled and adjusted in advance. As a result, if the road in front of the vehicle is detected to curve before a driver turns the steering wheel, the driver's forward visibility can be improved by first swiveling and adjusting the optical axis of the headlight.

BRIEF DESCRIPTION OF THE DRAWINGS

The above and other objects, features and advantages of the present invention will become more apparent from the following detailed description made with reference to the accompanying drawings. In the drawings:

FIG. 8 is a diagrammatic view showing a relationship between the shape of a road in front of a travelling vehicle, headlight illumination areas, and a swivel light illumination area in the related art; and FIGS. 9A and 9B are diagrammatic views showing a method of determining a desired swivel angle according to white lines, etc. on a road in front of a travelling vehicle from the shape of a road and a relative position of the vehicle to the road.

DETAILED DESCRIPTION OF THE PREFERRED EMBODIMENT

Figure 1:
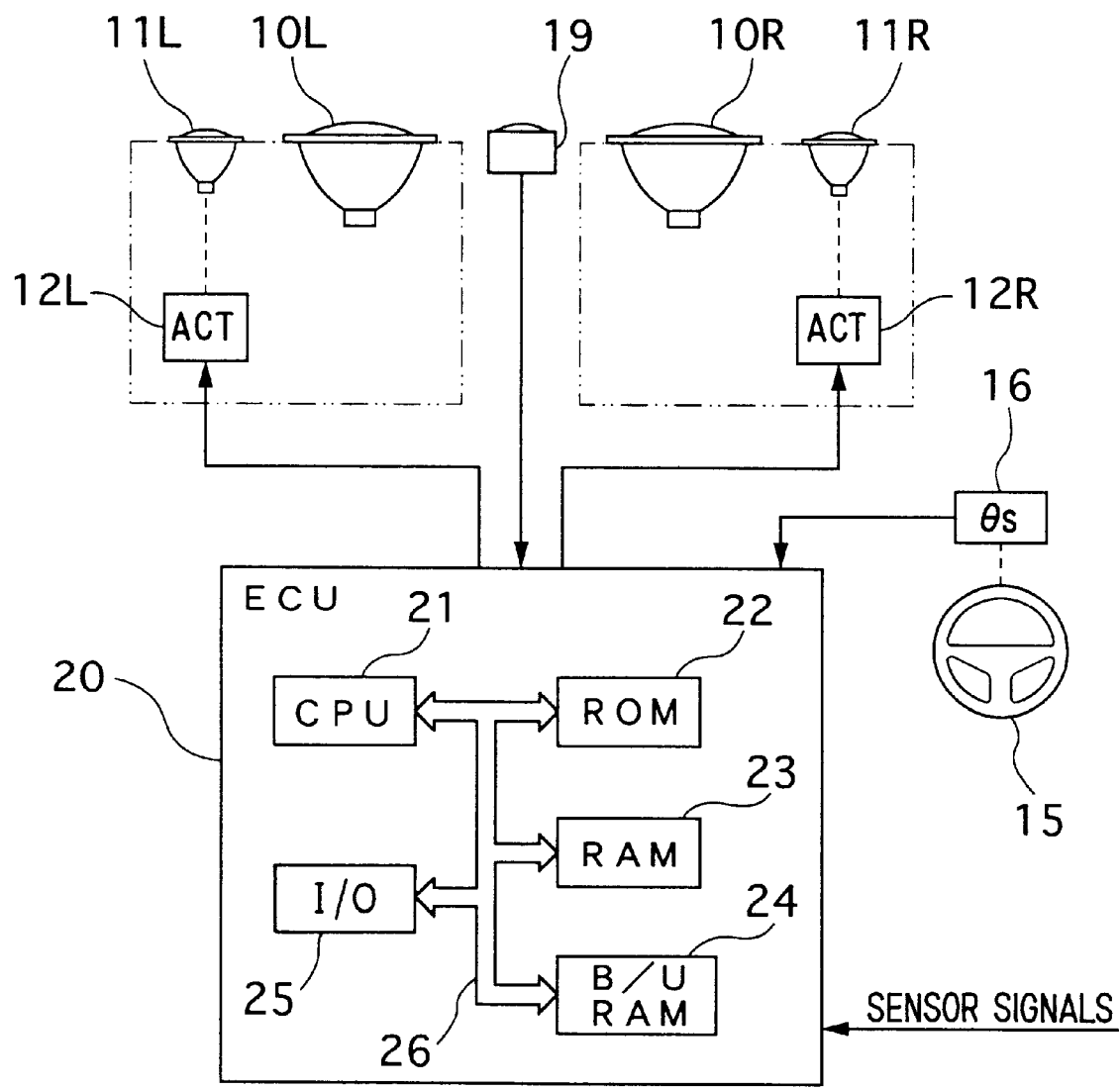
FIG. 1 is a schematic view showing an apparatus for automatically adjusting an optical axis of vehicle headlights according to a preferred embodiment of the present invention.

Referring first to FIG. 1, left and right headlights 10L and 10R are disposed at the front of a vehicle as front headlights, and left and right swivel lights 11L and 11R are disposed separately. An electronic control unit (ECU) 20 is a logic circuit comprising a CPU 21 as a central processing unit, ROM 22 for storing a control program and control data, RAM 23 for storing various data, backup RAM 24, input/output circuit 25, and a bus line 26 for connecting these components.

The output signal from a steering angle sensor 16 for detecting the steering angle θs of the steering wheel 15 is applied to the ECU 20. The output signal from a CCD camera 19 for detecting image of a forward view of the vehicle is applied to the ECU 20. Other sensor signals are also applied to the ECU 20. The output signal from the ECU 20 is input to actuators 12L and 12R for the left and right swivel lights 11L and 11R of the vehicle so that the optical axis of the left and right swivel lights 11L and 11R is adjusted.

Figure 2:
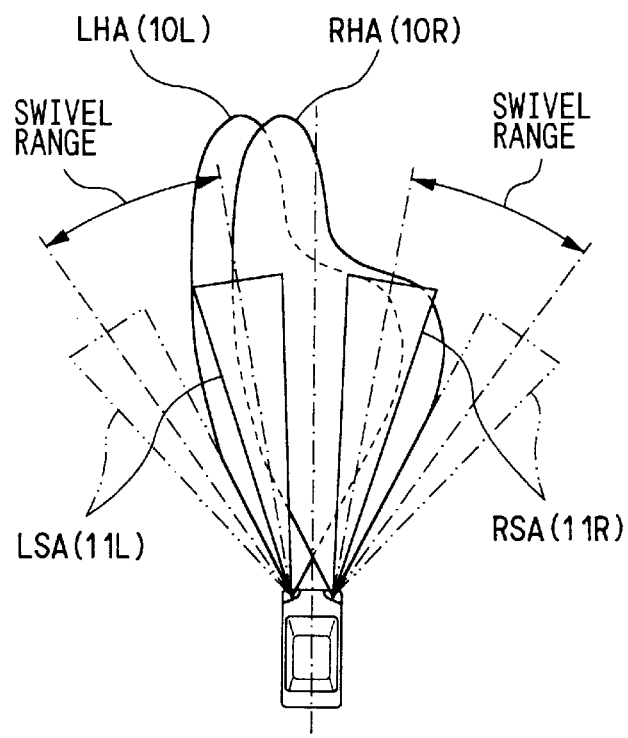
FIG. 2 is a diagrammatic view showing illumination areas of headlights and swivel lights in the preferred embodiment.

As shown in FIG. 2, it will be noted that the left headlight low beam illumination area LHA of headlight 10L and the right headlight low beam illumination area RHA of headlight 10R are fixed side to side. The illumination area LSA of swivel light 11L is adjustable within the swivel control range according to the steering wheel 15 turning to the left from the neutral position. The illumination area RSA of swivel light 11R is adjustable within the swivel control range according to the steering wheel 15 turning to the right from the neutral position.

Figure 3:
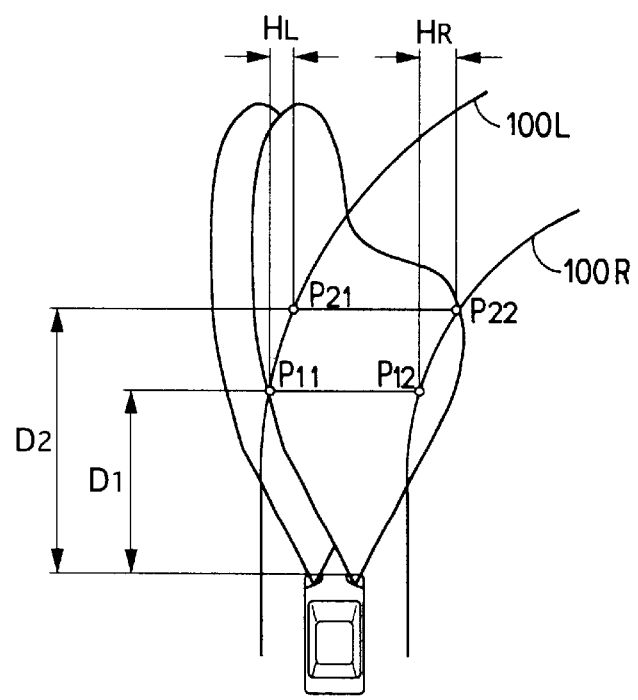
FIG. 3 is a diagrammatic view showing a method of detecting the shape of a road in front in the preferred embodiment.

It is assumed that, as shown in FIG. 3, white lines 100L and 100R applied to a road surface as a lane marker indicating the lane width turns to the right in front of the vehicle. Two points P11, P21 on the left white line 100L and two points P12, P22 on the right white line 100R are detected as position information at two different distances D1 and D2 on the road surface in front of the vehicle by the CCD camera 19 using image recognition technology. The distance HL in the direction perpendicular to the direction of vehicle travel between the two points P11, P21 on the left white line 100L, and distance HR between the two points P12, P22 on the right white line 100L are then calculated. A curve to the right is detected when the distance HL or distance HR that is a difference in positions of two points on the same white line is greater than a predetermined threshold value.

The ECU 20 calculates a desired swivel angle for swiveling the optical axis of swivel light 11R to the right based on these distances HL and HR. Using the desired swivel angle thus calculated, the optical axis of the left and right swivel lights 11L and 11R can be accurately swiveled according to the shape of the road in front regardless of where the vehicle is in relation to the lane width before the ECU 20 detects a change in steering angle θs of the steering wheel 15.

Displacement of the white line recognition positions increases in the direction perpendicular to the direction of travel as the vehicle approaches a curve, and will leave the illumination area of the left and right headlights 10L and 10R. It is therefore possible to detect the shape of the road to the front when the vehicle is a certain distance from the curve. However, as the vehicle approaches the entrance of the curve, it conversely becomes not possible to detect the shape of the road to the front.

Figure 4:
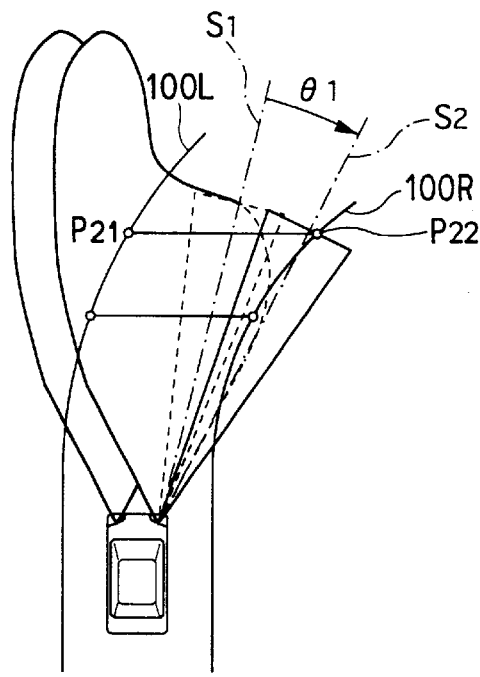
FIG. 4 is a diagrammatic view showing a method of detecting the shape of a road in front in the preferred embodiment when a vehicle approaches close to a curve.

This can be resolved by adjusting the optical axis orientation S1 of the right swivel light 11R by swivel control angle θ1 to axis orientation S2 using the swivel function so that the extreme right position P22 on the white line can be continually illuminated as shown in FIG. 4.

Figure 5:
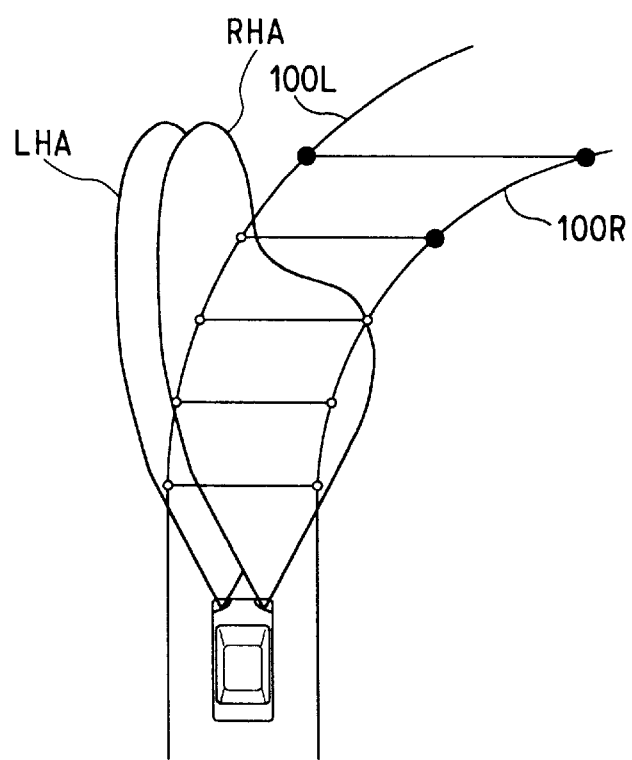
FIG. 5 is a diagrammatic view showing a method of detecting the shape of the road in front using a recognition reliability of plural points set on a white line on the road in front in the preferred embodiment.

As shown in FIG. 5, recognition reliability at plural points on left and right white lines 100L and 100R perpendicular to the direction of vehicle travel at plural different distances on the road in front of the vehicle is also determined from, for example, the contrast to the road surface (background). Those points for which recognition reliability is greater than a specific level (shown as white dots in FIG. 5) are then determined to be accurately detected, and the desired swivel angle for swiveling the optical axis of the swivel light 11R to the right is calculated based on distances HL and HR using the plural points including the farthest points as described above.

It should be noted that the left or right side white line 100L, 100R may not be present or may disappear on actual roads. In this case road curvature can be detected based on the direction of the line between the near and far points used to calculate distance HL or distance HR when either distance HL or HR exceeds the specific threshold value. For an even more accurate evaluation, a road curve can be detected when both distances HL and HR exceed a specific threshold value.

Figure 6:
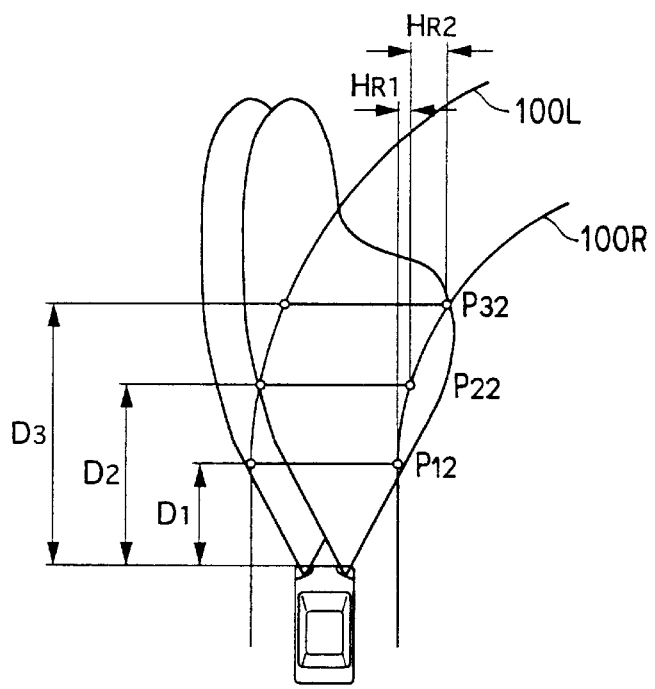
FIG. 6 is a diagrammatic view showing a method of detecting the shape of the road in front in the preferred embodiment.

Alternatively, as shown in FIG. 6, three points P12, P22, P32 at three different distances D1, D2 and D3 on the road surface in front of the vehicle on the right white line 100R in the direction perpendicular to the direction of vehicle travel may be detected as position information by the CCD camera 19 using image recognition technology. In this instance, distance HR1 between two points P12 and P22 on the right side white line 100R and distance HR2 between two points P22 and P32 on the right side white line 100R are then calculated. A curve to the right can be detected when distance HR1 or distance HR2 is greater than a predetermined threshold value. The desired swivel angle for swiveling the optical axis of the swivel light 11R to the right can then be calculated based on distances HR1 and HR2. It is also possible to detect curving of the road based on a difference between the distances HR1 and HR2.

As described above, when the shape of the road in front of the vehicle can be recognized based on the displacement of position information on white lines 100R and 100L indicating the lane width, linking road detection to the white lines 100R and 100L is effective because swivel control can be achieved before the steering angle θs changes due to actual turning of the steering wheel 15. Depending upon the reliability of white line recognition, however, control tends to become unstable particularly when a vehicle is cornering. Yet further, linking swivel control to the steering angle θs of the steering wheel 15 when cornering is preferable to linking control to the white lines 100R and 100L because it matches feel of a driver.

Figure 7A:
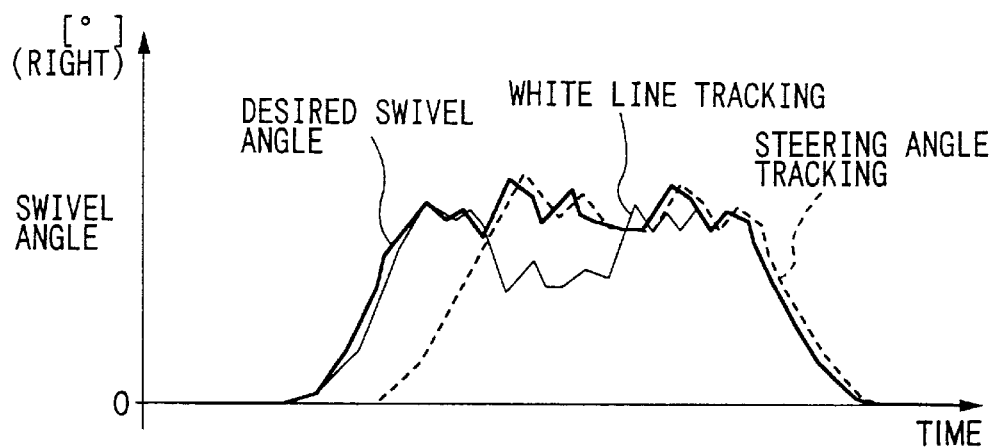
FIGS. 7A and 7B are timing diagrams showing a desired swivel angle, for example, based on detection of the shape of the road in front in the preferred embodiment.
Figure 7B:
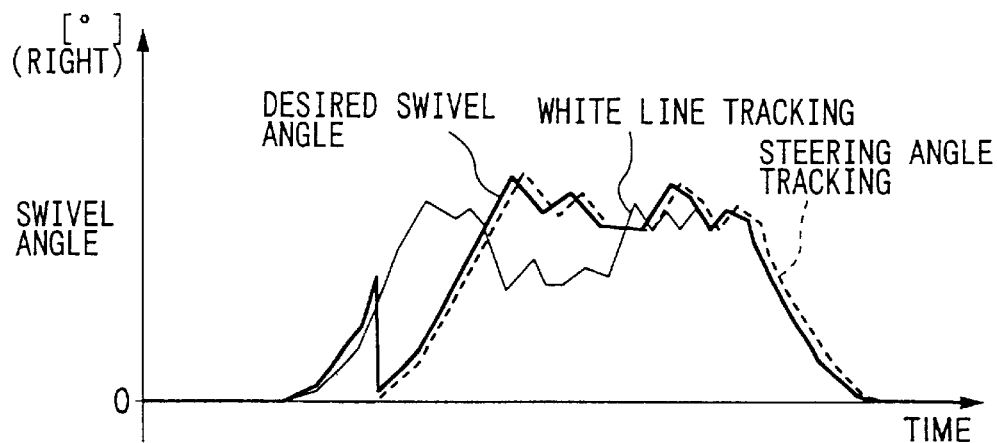

Swivel control in this case is described next with reference to FIGS. 7A and 7B. FIG. 7A shows the desired swivel angle calculated by detecting the road shape in front according to the present invention. FIG. 7B shows another desired swivel angle for comparison.

As shown by the fine solid line in FIG. 7A and FIG. 7B, swivel control for adjusting the optical axis orientation of the left and right swivel lights 11L and 11R at the beginning of a curve is responsive to the white line 100L, 100R because tracking the white line achieves a good swivel angle. If steering angle tracking then begins based on the steering angle θs of the steering wheel 15 when the vehicle enters the curve, the swivel angle responsive to the steering angle θs is obtained as shown by the dotted line in FIG. 7A and FIG. 7B.

If at this time the desired swivel angle indicated by the bold solid line in FIG. 7B shifts immediately to the swivel angle responsive to the steering angle θs from steering angle tracking as indicated by the dotted line in FIG. 7B, swivel control returns to the neutral position once and then follows the steering angle. A discontinuity in swivel control thus occurs and swivel control does not match feel of the driver.

To eliminate this discontinuity, the desired swivel angle at the start of the curve is in advance set to the swivel angle determined by white line tracking as shown by the bold line in FIG. 7A. When the swivel angle responsive to the steering angle θs from steering angle tracking exceeds the swivel angle determined by white line tracking, the desired swivel angle is switched to the swivel angle responsive to the steering angle θs. Once the swivel angle responsive to the steering angle θs exceeds the swivel angle responsive to white line tracking, the desired swivel angle is determined by steering angle tracking. The desired swivel angle is thus stabilized, a stable desired swivel angle that match feel of the driver is the achieved, and the optical axis of the vehicle swivel light 11R, 11L is appropriately adjusted in according with the desired swivel angle. It should be noted that the desired swivel angle can be set to a greater swivel angle determined by either white line tracking or steering angle tracking.

The present invention should not be limited to the above preferred embodiment, but may be modified in many other ways.

What is claimed is:

1. An apparatus for automatically adjusting an optical axis of a vehicle headlight comprising:
    a steering angle detecting means for detecting a steering angle of a vehicle steering wheel;
    a forward information detecting means for detecting a forward road shape based on displacement of position information at at least two different distances to a line marking indicating lane width on a road surface in front of the vehicle;
    a swivel control means for swiveling and adjusting an optical axis of the vehicle headlight right and left parallel to the road surface based on the steering angle detected by the steering angle detecting means; and
    an advance control means for first swivel adjusting the optical axis of the headlight when the forward information detecting means detects that the shape of the road in front curves before the steering angle detecting means detects a steering angle, the advance control means taking priority over the swivel control means in adjusting the optical axis of the headlight until an adjustment angle determined based on the steering angle exceeds an adjustment angle calculated based on the forward information.

2. A method of adjusting an optical axis of a headlight of a vehicle comprising steps of:
    detecting positions of a lane marking line of a road existing two different distances ahead of a vehicle and a steering angle of a steering wheel by sensors, respectively;
    determining whether the road is turning based on the detected positions;
    starting an optical axis control based on a determination result indicating turning of the road; and
    switching the optical axis control based on the determination result to another optical axis control based on the detected steering angle.

3. The method as in claim 2, wherein the determining step determines the turning of the road when a difference between the detected positions of the lane marking line is greater than a predetermined threshold value.

4. An apparatus as in claim 1, wherein the forward information detecting means comprises an image sensor that is mounted on the vehicle.

5. An apparatus as in claim 2, wherein the forward information detecting means comprises an image sensor that is mounted on the vehicle.

6. A headlight system for a vehicle comprising:
    a pair of headlights for providing illumination in a direction that is primarily in front of the vehicle;
    a pair of swivel lights each having an adjustable optical axis and for providing additional illumination as the vehicle approaches and enters a curve;
    a steering angle detector for detecting a vehicle steering wheel steering angle;
    a forward information detector for detecting a forward road shape based on displacement of position information at at least two different distances to a line marking indicating lane width on a road surface in front of the vehicle; and
    a controller for swiveling and adjusting an optical axis of the swivel lights, the controller first swiveling and adjusting the optical axis of the swivel lights based on the forward road shape detected by the forward information detector when the forward road shaped is detected to be curved and then swiveling and adjusting the optical axis of the swivel lights based on the steering angle detected by the steering angle detector.

* * * * *